United States Patent
Shyu (10) Patent No.: US 7,313,282 B2
(45) Date of Patent: Dec. 25, 2007

(54) METHOD AND APPARATUS FOR DIGITAL SIGNAL PROCESSING

(75) Inventor: Rong-Fuh Shyu, Hsinchu (TW)

(73) Assignee: Winbond Electronics Corporation, Hsinchu (TW)

( * ) Notice: Subject to any disclaimer, the term of this patent is extended or adjusted under 35 U.S.C. 154(b) by 690 days.

(21) Appl. No.: 10/215,053

(22) Filed: Aug. 8, 2002

(65) Prior Publication Data

US 2003/0169930 A1 Sep. 11, 2003

(30) Foreign Application Priority Data

Mar. 11, 2002 (TW) .............................. 91104509 A (51) Int. Cl.
*G06K 9/36* (2006.01)

(52) U.S. Cl. .................. 382/236; 382/232; 382/233

(58) Field of Classification Search ........ 382/232–233, 382/235–236; 708/300
See application file for complete search history.

(56) References Cited

U.S. PATENT DOCUMENTS

| | | | | |
|---|---|---|---|---|
| 5,832,121 A | * | 11/1998 | Ando | ........................ 382/236 |
| 5,859,932 A | * | 1/1999 | Etoh | ........................ 382/253 |
| 6,097,842 A | * | 8/2000 | Suzuki et al. | ............... 382/232 |
| 6,233,356 B1 | * | 5/2001 | Haskell et al. | .............. 382/243 |

* cited by examiner

*Primary Examiner*—Duy M. Dang
(74) *Attorney, Agent, or Firm*—Birch, Stewart, Kolash & Birch, LLP (57) ABSTRACT

The present invention is a method and an apparatus for digital signal processing. The method extracts a plurality of data which is not zero or repeated and recognizes a plurality of coordinate data corresponding to the extracted data. The method saves memory space and makes digital signal processing more efficient.

4 Claims, 8 Drawing Sheets

| coordinate | value |
|---|---|
| (0,0) | a |
| (1,0) | b |
| (1,1) | c |
| (7,7) | d |

FIG. 6b
(PRIOR ART)

| (0,0) | value' a' | (1,0) | value' b' | (1,1) | value' c' | (7,7) | value' d' |

METHOD AND APPARATUS FOR DIGITAL SIGNAL PROCESSING

BACKGROUND OF THE INVENTION

Pursuant to 35 U.S.C. § 119(a)-(d), this application claims priority from Taiwanese application no. 91104509, filed on Mar. 11, 2002.

FIELD OF THE INVENTION

The present invention relates to digital signal processing and more particularly pertains to a method and apparatus for processing and storing a digital signal efficiently.

DESCRIPTION OF THE RELATED ART

A digital signal processing system, for example, an image data compression and decompression system, removes a plurality of meaningless data while compressing and restores the meaningless data while decompressing. The time required to compress and decompress reduces the efficiency of digital signal processing. When a digital signal processing system performs an arithmetic process to an image data, for example, during the compressing and decompressing, a digital signal processing system performs a plurality of multiplication or MAC processes. For example, in a dequantizing step during decompressing, a plurality of multiplication processes are performed, while in a inverse discrete cosine transfer (IDCT) step, a plurality of MAC processes are performed, and so on. If a data value is zero, the data is meaningless and unnecessary to perform an arithmetic process. Therefore, a conventional digital signal processing system performs a plurality needless processes and is therefore inefficient.

SUMMARY OF THE INVENTION

In view of the foregoing disadvantage inherent in a digital signal processing system in the prior art, it is one object of the present invention to provide a method and an apparatus to process a digital signal efficiently.

To attain the object of the present invention, a method for digital signal processing is provided, comprising the following steps: inputting a digital signal; then extracting a plurality of first data which is not meaningless from the digital signal; then recognizing a first coordinate data from each first data; then processing the first data through an arithmetic process to obtain a processed data; then extracting a plurality of second data which is not meaningless from the processed data; then recognizing a second coordinate data from each second data; then combining the second data and the second coordinate data to obtain a processed digital signal, then outputting the processed digital signal.

The present invention also provides a system for digital signal processing, comprising: a coordinate recognition unit for inputting a digital signal and extracting a plurality of data which are not meaningless and recognizing a plurality of coordinate data corresponding to the data, and outputting the data and the coordinate data; and a data process unit for inputting and processing the data and getting a plurality of processed data, and outputting the processed data; and a coordinate formalization unit for inputting the processed data and calculating a plurality of coordinate data corresponding to the processed data, and outputting a processed signal which combines the processed data and the coordinate data.

Further scope of the applicability of the present invention will become appurent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Similar reference characters denote corresponding feature consistently throughout the attached drawings.

DETAILED DESCRIPTION OF THE PREFERRED EMBODIMENT

In the following, the term "meaningless data" refers to a data with a value near zero or repeated data.

Figure 1:
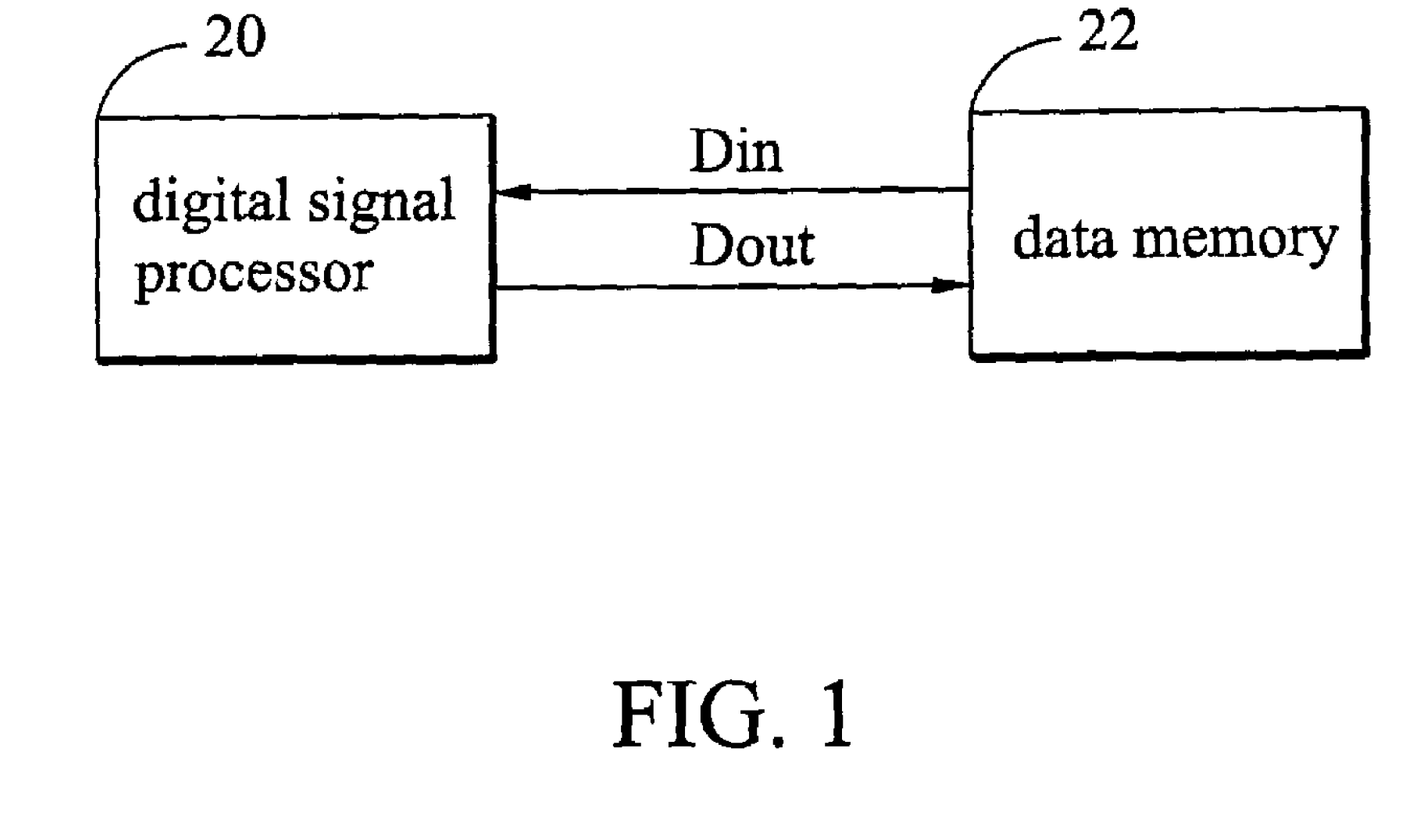
FIG. 1 illustrates a block diagram for digital signal processing.

Image data processing is an example of a method for processing and storing a digital data. During the image data processing, an image data outputted from a digital signal processor is stored into a data memory prior to digital signal processing. With reference to the drawings, FIG. 1 illustrates a block diagram of a digital signal processing system. A digital signal processor 20 processes a digital signal data, and outputs and stores a processed digital signal data Dout into a data memory 22 through an output bus. In next step, the digital signal processor 20 inputs the processed digital data signal Din from the data memory 22 through an input bus then outputs and stores another processed digital data signal in the data memory 22. Thus, each processed digital signal performed by the digital signal processor is stored in the data memory before the digital signal processor performs another processing.

Figure 2:
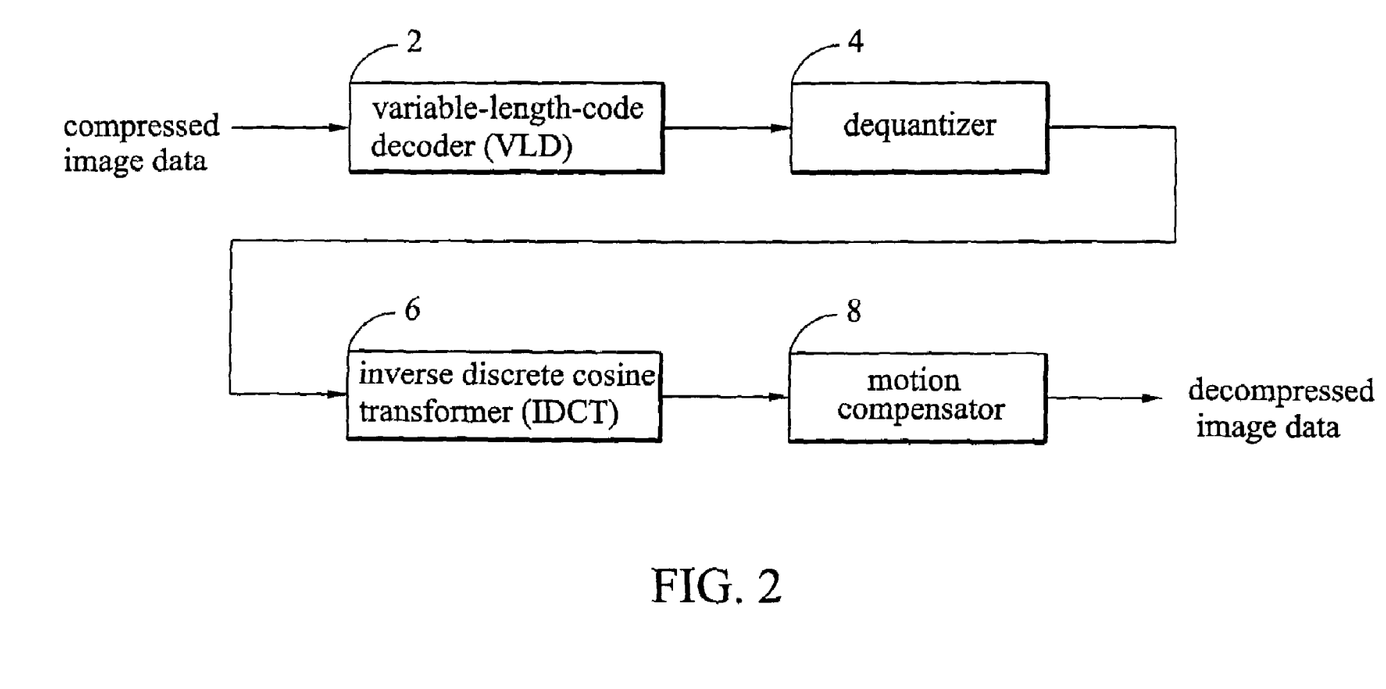
FIG. 2 illustrates a block diagram of an image data decompressing apparatus.

FIG. 2 illustrates a block diagram of an image data decompressing apparatus. An image data decompressing apparatus comprises a variable-length-code decoder 2 (VLD), a dequantizer 4, an inverse discrete cosine transformer 6 (IDCT) and a motion compensator 8. The image data decompressing apparatus inputs a compressed image data and obtains a decompressed image data through the VLD 2, the dequantizer 4, the IDCT 6 and the motion compensator 8.

Figure 3:
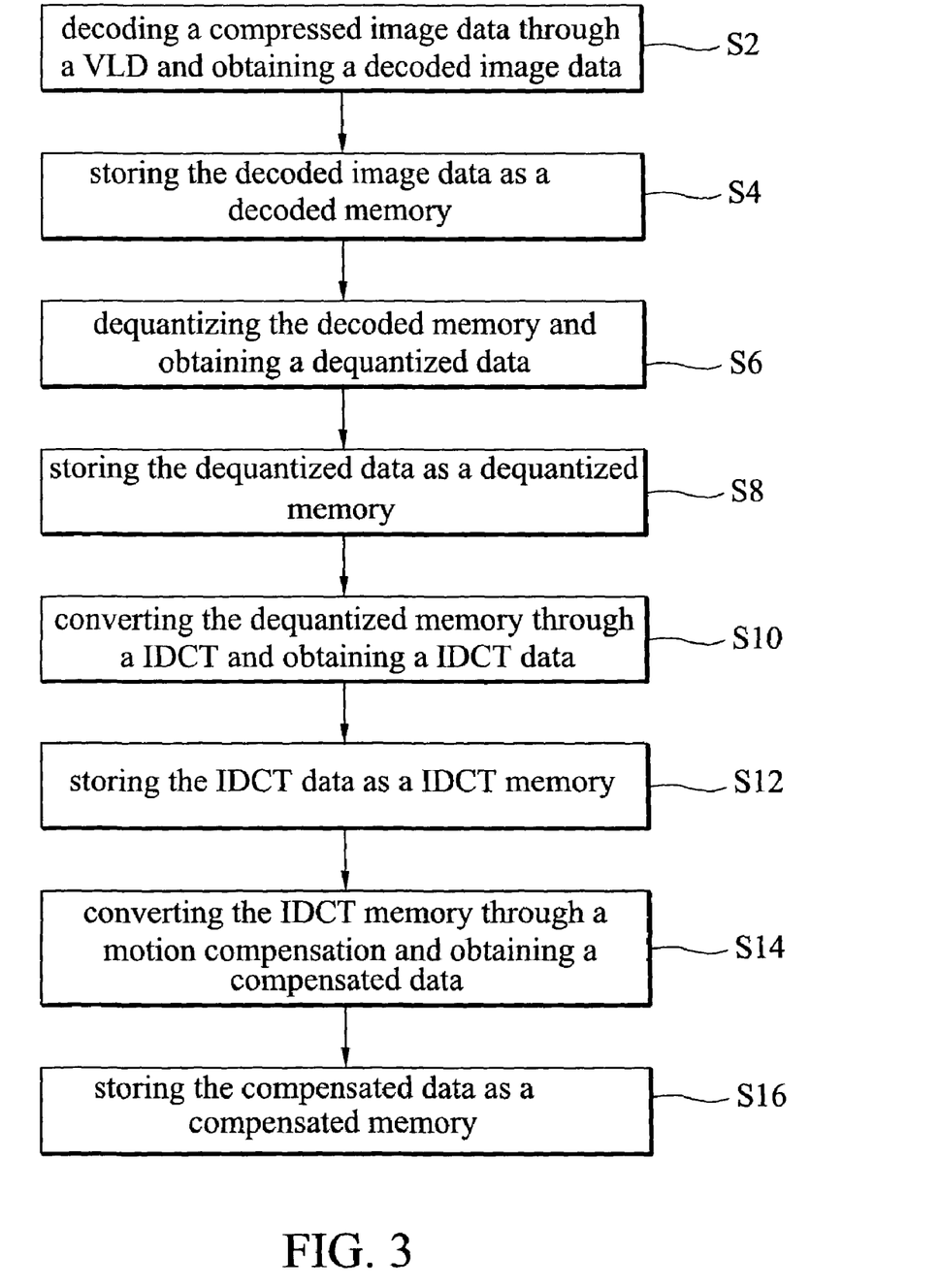
FIG. 3 illustrates a block diagram of a decompressing process for an image data.

A digital signal, for example, an image data is stored into the data memory and processed by the digital signal processor in the next step. For example, FIG. 3 illustrates a block diagram of a decompressing process for an image data referred to the image data decompressing apparatus in FIG. 2. In step S2, a compressed image data is decoded through a VLD and a decoded image data is obtained. In step S4, the decoded image data is stored as a decoded memory. In step S6, the decoded memory is dequantized and a dequantized data is obtained. In step S8, the dequantized data is stored as a dequantized memory. In step S10, the dequantized memory is converted through an IDCT and an IDCT data is obtained. In step S12, the IDCT data is stored as an IDCT memory. In step S14, the IDCT memory is converted through a motion compensation and a compensated data is obtained. In step S16, the compensated data is stored as a compensated memory.

Figure 5:
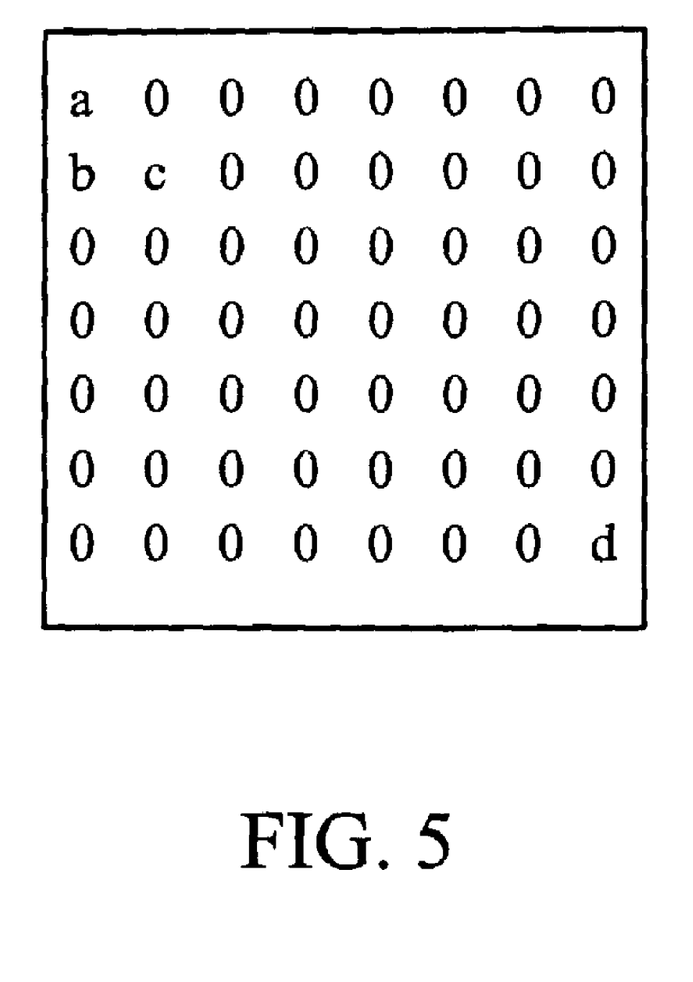
FIG. 5 illustrates a structure diagram of a block unit.

While an image data is processed, a frame is divided into a plurality of blocks for compressing or decompressing. An image data of one block is stored as a block unit as shown in FIG. 5. A block unit includes not only the image data but also a processed image data. The processed image data can be, for example, the difference between a prediction pixel data and an inside-code frame (I-Frame) pixel data processed through a motion estimation process, or a DCT data through the quantity process or a IDCT data through the dequantity process. Except for the data in the upper left and the lower right of the block unit, the values of a plurality of data in the block unit as shown in FIG. 5 are zero.

Figure 4:
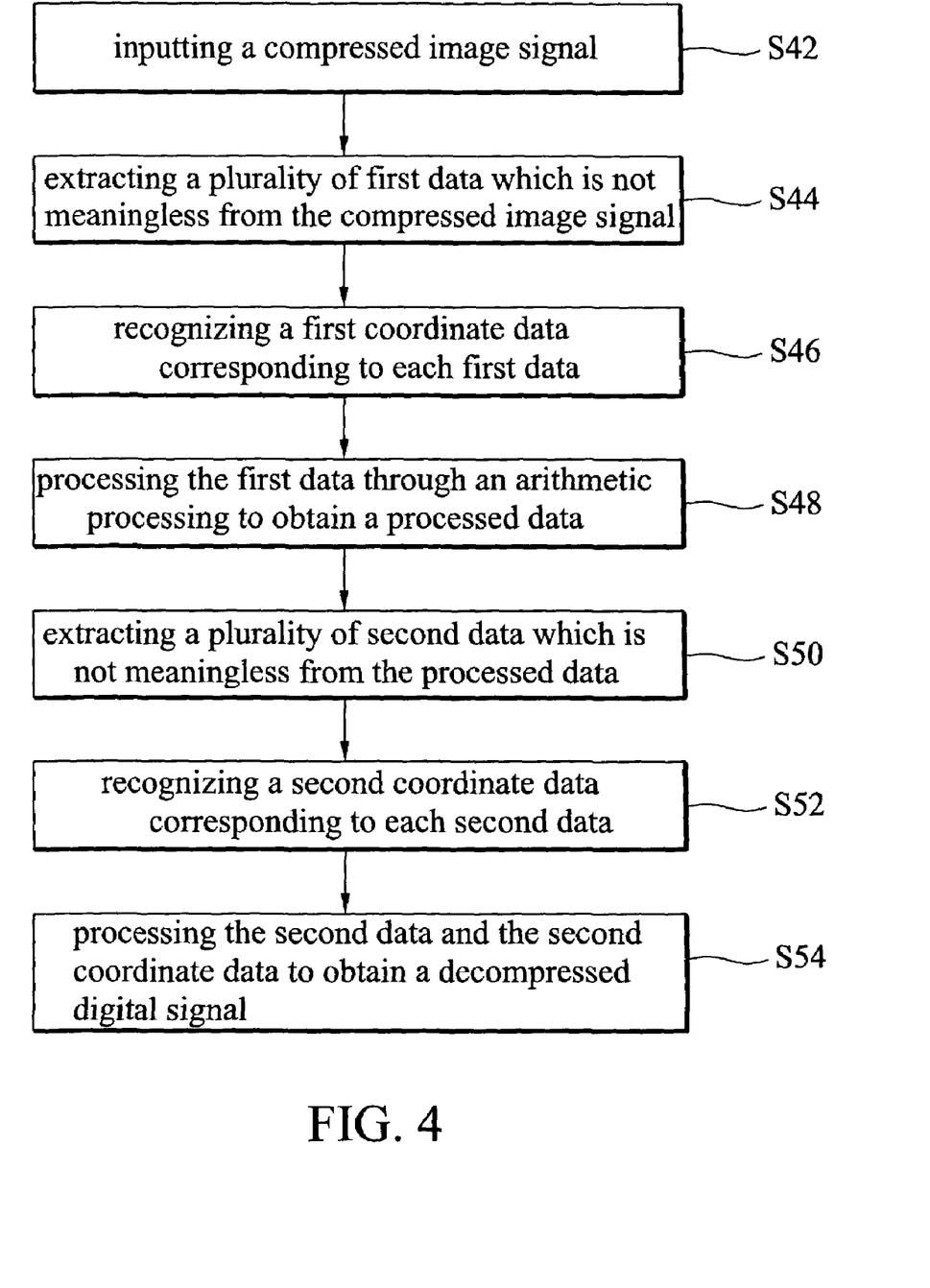
FIG. 4 illustrates a block diagram of a method of the invention.

FIG. 4 illustrates a block diagram of a method of the present invention with reference to the block unit as shown in FIG. 5. The method is used to process a digital signal. The method includes the following steps. In step S42, a digital signal is inputted. In step S44, a plurality of first data which are not meaningless are extracted from the digital signal. In step S46, a first coordinate data corresponding to each first data is recognized. In step S48, the first data is processed through an arithmetic processing to obtain a processed data. In step S50, a plurality of second data which are not meaningless are extracted from the processed data. In step S52, a second coordinate data corresponding to each second data is recognized. In step S54, the second data and the second coordinate data are combined to obtain a processed digital signal. In step S56, the processed digital signal is outputted.

The processed digital signal is outputted and stored into a memory. The method for storing the processed digital data and the coordinate data can be achieved by conventional methods known in the art. For example, two methods for storing the processed digital data and the coordinate data are illustrated in FIGS. 6a and 6b.

Figure 6A:
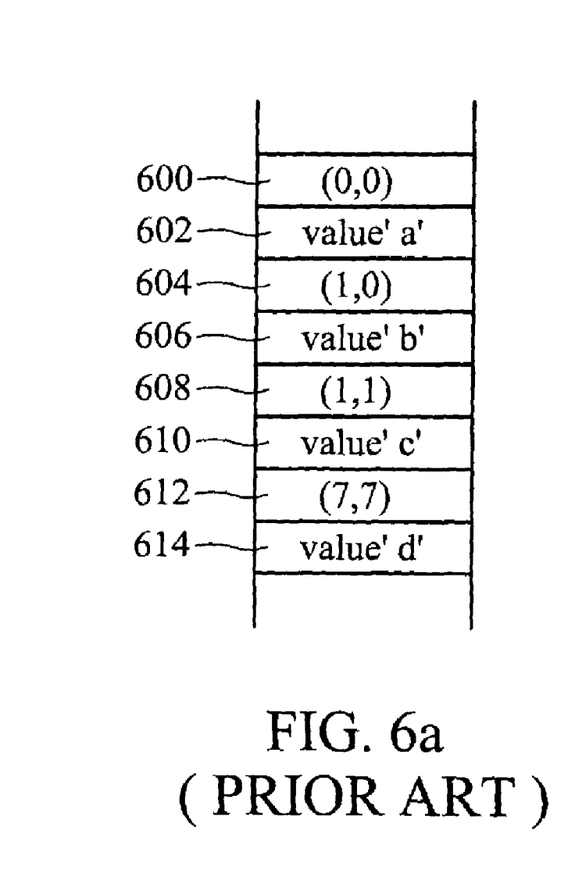
FIGS. 6a and 6b illustrate a structure diagram for storing a decompressed image data referred to the FIG. 3.

FIG. 6a illustrates a structure diagram for storing a decompressed image data with reference to the FIG. 3. Each data next to each coordinate data is stored as an entry. A data 'a' is stored as an entry 602 and a coordinate data (0, 0) corresponding to the data 'a' is stored as an entry 600. A data 'b' is stored as an entry 606 and a coordinate data (1, 0) corresponding to the data 'b' is stored as an entry 604, and so on. The processed digital data which is not meaningless and the coordinate data corresponding to the data are stored between the entry 608 and 614.

Figure 6B:
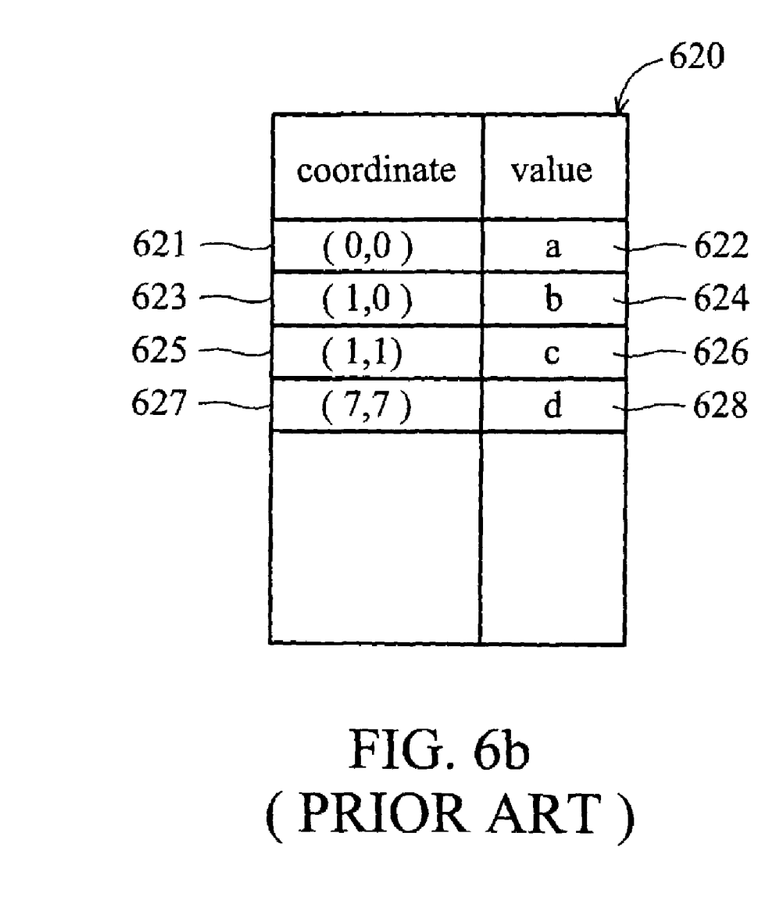

FIG. 6b illustrates a structure diagram for storing a decompressed image data with reference to the FIG. 3. Each data is stored in a data field and the each coordinate data corresponding to the data is stored in a coordinate field of a table 620. A data 'a' is stored in the data field 622 and a coordinate data (0, 0) corresponding to the data 'a' is stored in the coordinate field 621. A data 'b' is stored in the data field 624 and a coordinate data (1, 0) corresponding to the data 'b' is stored in the coordinate field 623. The processed digital data which is not meaningless and the coordinate data corresponding to the data are stored in the data fields and the coordinate fields, respectively.

The method of the present invention processes a digital signal, stores the processed digital data, transforms linear data to coordinate data and ignores a plurality of data which are meaningless, thereby saving memory space. Because a plurality of meaningless data are ignored, the time for processing or transforming can be reduced and the efficiency of the digital signal processing is improved.

Figure 7:
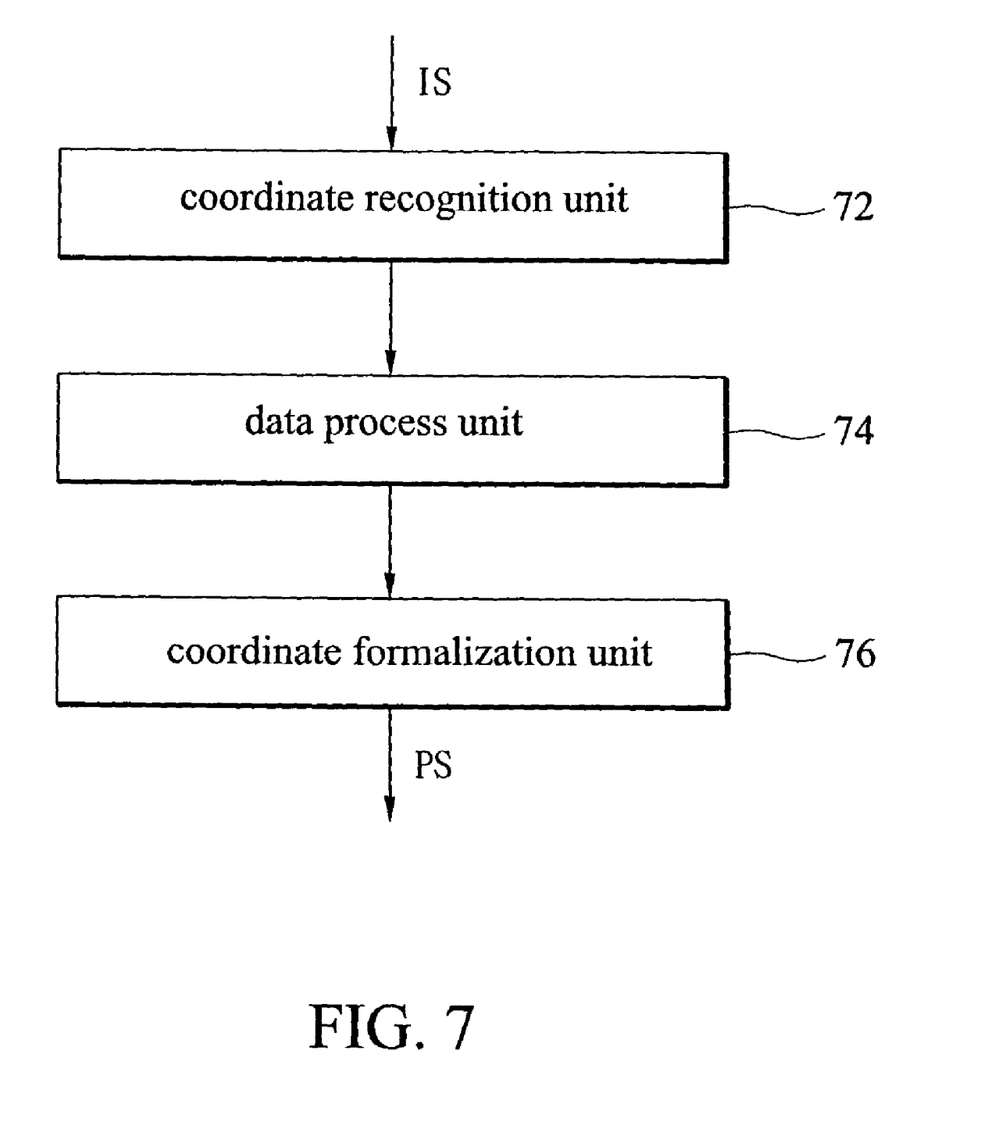
FIG. 7 illustrates a structure diagram of a preferred embodiment.
Figure 8:
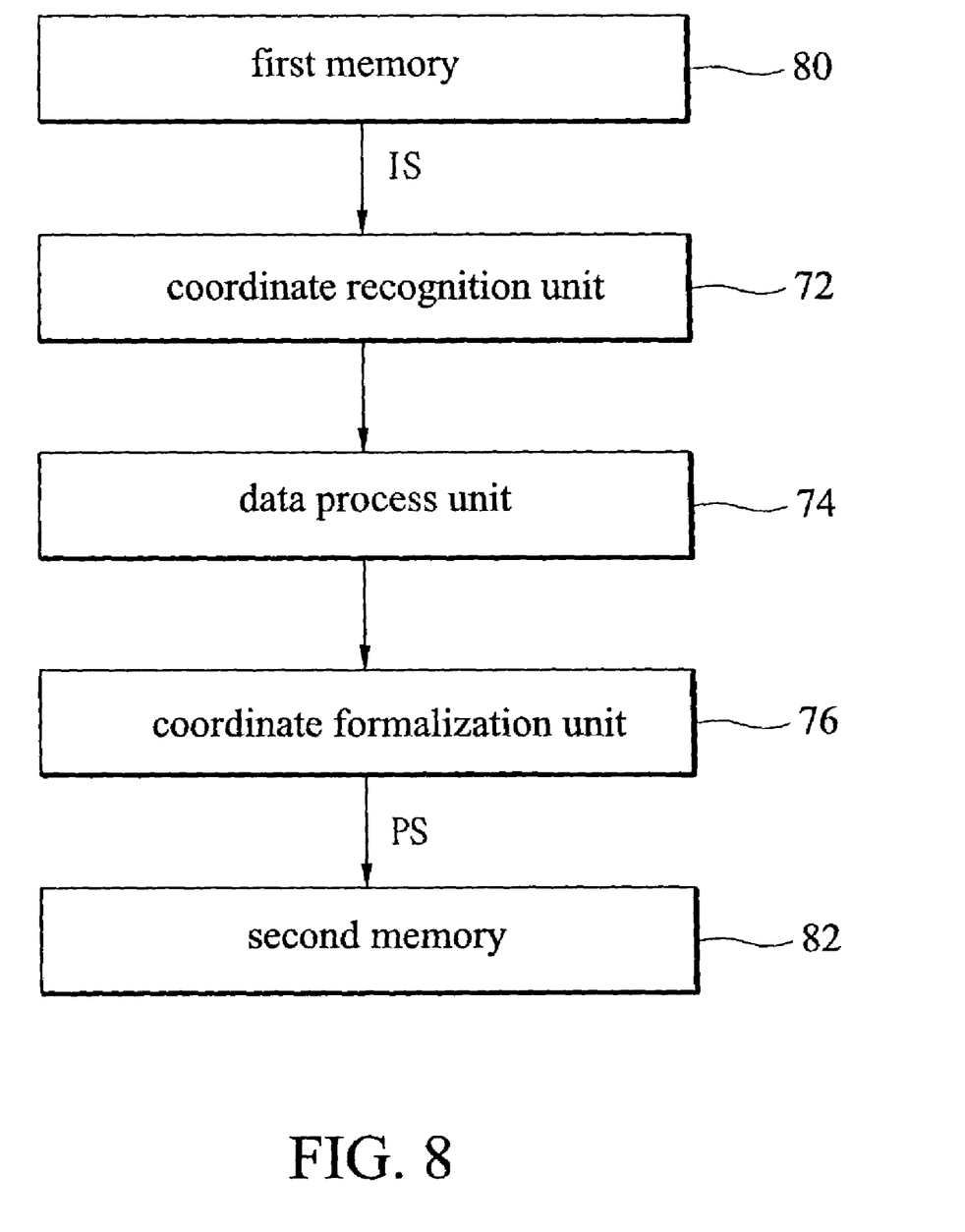
FIG. 8 illustrates a structure diagram of a preferred embodiment.

A preferred embodiment of a digital signal processing system is also provided. The digital signal processing system includes: a coordinate recognition unit 72 for inputting a digital signal IS and extracting a plurality of data which are not meaningless and recognizing a plurality of coordinate data corresponding to the data, then outputting the data and the coordinate data; a data process unit 74 for inputting and processing the data and getting a processed data, then outputting the processed data; a coordinate formalization unit 76 for inputting the processed data and calculating a plurality of coordinate data corresponding to the processed data, and outputting a processed signal PS which combines the processed data and the coordinate data. As shown in FIG. 8, the system further includes a first memory 80 for storing a digital signal and outputting the digital signal; a second memory 82 for storing the processed signal PS. The first memory 80 and the second memory 82 can be the same one.

The data process unit 74 can be a dequantizer, a IDCT or a motion compensator in a image data decompressing apparatus, or a quantizer or a discrete cosine transfer in a image data compressing apparatus.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for digital signal processing, comprising the following steps:

inputting a digital signal;

extracting a plurality of first data which is not meaningless and dropping all meaningless data from the digital signal, wherein meaningless data is data with a value near zero or repeated data;

recognizing a first coordinate data corresponding to each first data;

processing the first data through an arithmetic process to obtain a processed data;

extracting a plurality of second data which is not meaningless and dropping all meaningless data from the processed data;

recognizing a second coordinate data corresponding to each second data;

combining the second data and the second coordinate data to obtain a processed digital signal; and outputting the processed digital signal.

2. The method as claimed in claim 1, further including the step of staring the processed digital signal in a memory, wherein each second data is next to each second coordinate data corresponding to the second data and stored in the memory.

3. The method as claimed in claim 1, further including the step of storing the processed digital signal in a memory, wherein each second data and each second coordinate data are stored as a plurality of entries.

4. The method as claimed in claim 1, further including the step of storing the procossed digital signal in a memory, wherein each second data is stored in a data field and each second coordinate data is stored in a coordinate field of a table.

* * * * *